Patented July 29, 1947

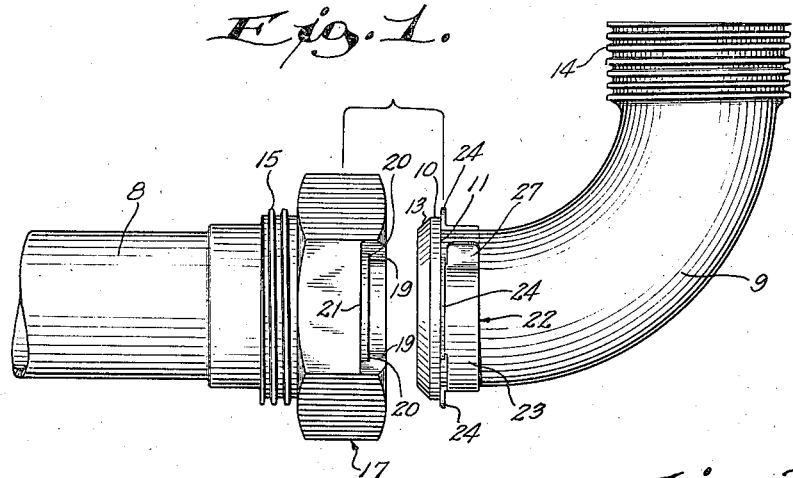
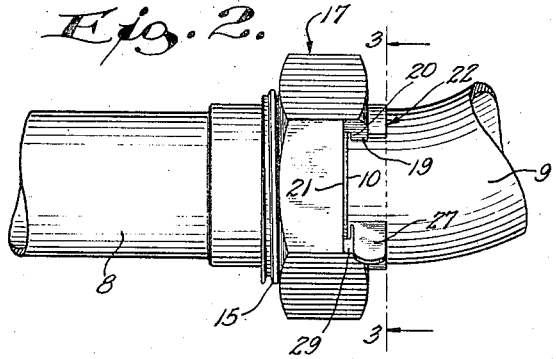
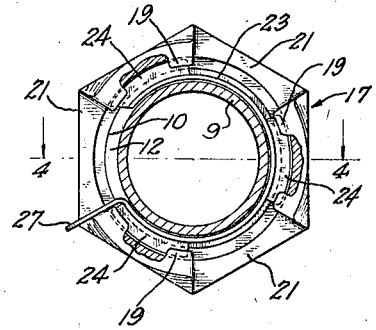
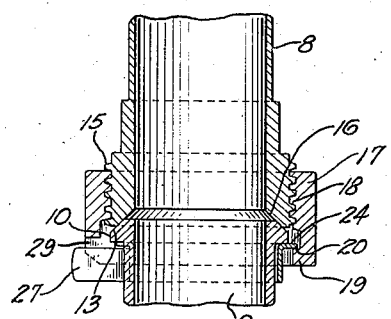
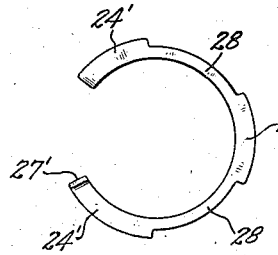
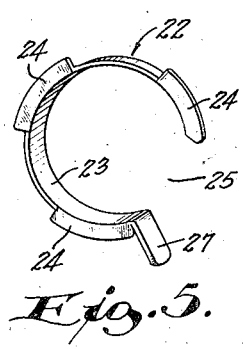

2,424,682

UNITED STATES PATENT OFFICE 2,424,682

SANITARY PIPE JOINT

Walter Ebert, Kenosha, Wis., assignor to Tri-Clover Machine Co., Kenosha, Wis., a corporation of Wisconsin Application March 10, 1945, Serial No. 582,025

9 Claims. (Cl. 285—122)

This invention relates to improvements in sanitary pipe joints.

Heretofore it has been common practice, in providing for the connection of adjacent ends of two pipe sections or conduits, to form the end of one section with an annular flange, and to form the adjacent end of the other section with threading, which is cooperable with the threading of a union nut loosely surrounding the first section and cooperable with the annular flange thereon. Naturally, the flange has been of greater external diameter than the diameter of the bore of the union nut, through which the first pipe section extends, and, therefore, removal of the union nut from the pipe section is impossible. This is not only inconvenient but is highly objectionable when the pipe sections form part of a conduit for conveying milk or other like fluid wherein sanitation is required. The reason for this is that in dairy and food plants the pipe sections are taken down daily for cleaning, and the loose union nuts which cannot be removed from the sections slide back and forth on the sections during handling and cleaning and scratch the highly polished exterior finish.

Furthermore, it is difficult to properly clean the interior bores and threading of the union nuts while said nuts are on the pipe sections. In addition, the loose nuts, sliding back and forth on the pipe sections, are frequently damaged during such cleaning, necessitating replacement. When such replacement is required, either for the above reason or because the threads on the union nut have become injured or worn, it is now a difficult and lengthy procedure.

In addition to the above, it has heretofore been necessary in manufacturing L and T pipe sections to make the enlarged threaded end portion separately in order that the union nut can be first slipped onto the pipe section before the threaded end portion of larger diameter is connected. If it were not for the necessity of assembling the loose union nut, pipe sections of this type could be manufactured in one piece at considerably less expense.

It is, therefore, a general object of the present invention to provide in a pipe joint, means whereby the union nut may be rendered readily removable to thereby facilitate cleaning or replacement, to simplify manufacture, and to obviate the other above mentioned objectionable features of the non-removable union nut.

A more specific object of the invention is to provide in a pipe joint, including a pipe section having an annular flange at an end thereof, a union nut having spaced inwardly projecting arcuate flanges, the bore of said flanges of the union nut being of such diameter that it may be slipped over the annular flange of the pipe section, and there being a locking ring removably insertable adjacent the annular flange and having spaced radially extending wings which are insertable in the spaces between the arcuate flanges of the union nut. When the union nut is turned, the wings of the locking ring engage behind the shoulders of the union nut flanges so that when the union nut is tightened all of the parts are locked together and a good joint is obtained.

A further specific object of the invention is to provide a construction as above described wherein the locking ring is preferably of the split yieldable type, the external periphery of the radially extending wings having a greater diameter than the diameter of the bore outlined by the arcuate flanges of the union nut to thereby form projections which are engageable behind said arcuate flanges.

A further object of the invention is to provide a construction as above described wherein the adjacent ends of the pipe sections to be connected may have over-lapping, cooperating, annular tapered surfaces for automatically aligning the two pipe sections so that a tight seal is obtained when the union nut is drawn up.

A further object of the invention is to provide a construction as above described wherein the locking ring preferably has three radially extending wings which are equally spaced so that sealing pressures are equally distributed around the joint.

A further object of the invention is to provide a construction as above described wherein the locking ring is formed with an angularly bent lug at one end which engages an end of one of the cut-away portions of the union nut when the nut is being tightened to automatically maintain the wings of the locking ring in proper position.

A further object of the invention is to provide a construction as described including a yieldable split locking ring which is so constructed that it has no tendency to spread as the union nut is being tightened.

With the above and other objects in view, the invention consists of the improved pipe joint, and all its parts and combinations, as set forth in the claims, and all equivalents thereof.

In the accompanying drawing, illustrating two embodiments of the invention, in which the same reference numerals designate the same parts in all of the views:

Fig. 1 is a side view showing adjacent pipe sections about to be connected, with the parts in proper position for insertion;

Fig. 2 is a similar view after the nut has been tightened showing the final connection;

Fig. 3 is a sectional view taken on line 3—3 of Fig. 2, parts being broken away;

Fig. 4 is a sectional view taken on line 4—4 of Fig. 3;

Fig. 5 is a perspective view of the preferred form of locking ring alone; and

Fig. 6 is a plan view of a modified form of locking ring.

Referring more particularly to the drawing, the numeral 8 designates a first pipe section or tube, and the numeral 9 an adjacent section to be connected thereto. In the drawing, the section 9 is an L. This may, however, be a T or a straight section. The section 9 has one end formed with an annular flange 10 presenting an inwardly facing shoulder 11. The outer end of the flange is bevelled as at 13. The flange 10 may be part of a ferrule which is slipped onto the end of the tube or it may be otherwise formed in any selected way. The other end of the section 9 is formed with an enlarged threaded portion 14. With the present invention this enlarged threaded portion may be manufactured as an integral part of the pipe section because it is unnecessary to have a union nut permanently associated with the section 9. With prior constructions wherein the union nut is permanently associated with the section it has been necessary, during manufacture, to first slip the union nut onto the section 9 and then add either the flange 10 or the threaded section 14. This precluded the possibility of forming a pipe section in one piece.

The pipe section 8 has an enlarged threaded portion 15 at one end having an annular tapered surface 16 at the outer end of its bore which is cooperable with the tapered surface 13 of the pipe section 9 when the two pipe sections are connected in the manner shown in Fig. 4.

The improved union nut 17 is preferably hexagonal and has its main bore portion 18 threaded. Outwardly of the threaded bore portion the union nut has inwardly projecting arcuate flanges 19 which provide inner-shoulders 20. The union nut differs from union nuts of standard construction in that the flanged portions 19 are not parts of a continuous circle as is common practice; instead, the union nut of the present invention has the flanged portion 19 cut away at spaced intervals as at 21, with the surface 21 positioned inwardly somewhat beyond the shoulders 20 (see Fig. 2). In the preferred form of the invention there are three cut-away portions 21, each of which coincides with one side of the hexagonal shape of the union nut. Between each pair of cut-out portions 21 is one of the inwardly projecting flanged portions 19, each of which extends for 60 degrees around the union nut.

The preferred form of locking ring 22 is illustrated in Fig. 5. It comprises a band-portion 23 which is adapted to embrace the pipe section 9 as illustrated in Fig. 1, said band having spaced radially projecting wings 24 which are at right angles to the band portion. The wings 24 extend for about 60 degrees and are spaced about 60 degrees apart. The ends of the band 23 are normally separated by a gap 25 of about 60 degrees. One of the ends is formed with an angularly-bent lug 27.

A modified form of locking ring is illustrated in Fig. 6. In this form of ring there is no band corresponding to the band portion 23. Instead, the radial wings 24' are connected by narrow sections 28 which are in the same plane as the wings. There is also a lug 27' projecting at right angles from one of the ends to extend longitudinally of the pipe 8.

In assembling two pipe sections using the union nut and locking ring of the present invention, the ring 22 is first sprung into position on one of the pipe sections such as the pipe section 9 of Fig. 1. The locking ring is formed of yieldable steel and the ends may be separated sufficiently to permit insertion to the position of Fig. 1. The external diameter of the flange 10 of Fig. 1 is less than the internal diameter of the union nut flanges 19 (see Fig. 4). Thus, if it were not for the projecting wings 24 of the locking ring, the pipe section 9 could be readily inserted into the union nut shown in Fig. 1. However, by having the union nut only partially screwed onto the threading 15, and by aligning the wings 24 with the cut-away portions 21 of the union nut, then the flanged end of the pipe section 9 may be inserted into the bore of the union nut. When it has been inserted far enough so that the radially projecting wings 24 of the locking ring are just beyond the shoulders 20, then the union nut may be turned in a right hand direction to bring the three arcuate shoulders 20 in front of the radially extending wings 24. When this position is obtained, the angular tongue 27 of the locking ring will engage the end seat 29 of one of the cut-away portions to prevent further shifting of the locking ring with respect to the union nut as the union nut is being tightened. Upon further tightening of the union nut, the seat 29 will push against the tongue 27 of the locking ring to keep the locking ring rotating with the union nut and in proper position.

When the union nut has been completely tightened, the relationship of the parts is that shown in Figs. 2, 3 and 4. Referring particularly to Figs. 2, 3 and 4, it is apparent that the radial wings 24 of the locking ring project well beyond the external periphery of the flange 10 on the pipe section 9 to engage within the shoulders 20. The latter shoulders, therefore, bear against the projecting wings 24 of the locking ring as is clear from the drawings. To disconnect the joint it is merely necessary to turn the union nut a short distance in an unthreading direction and to push the tongue 27 from the position of Fig. 2 to a position in engagement with the seat 29 at the opposite side of the cut-away 21. This will bring all of the radial wings 24 into the cut-out portions 21 so that the pipe section 9 can be drawn straight out to the disconnected position of Fig. 1.

The modified locking ring of Fig. 6 is used in an identical manner except that there is no band portion 23. Instead, the entire locking ring of Fig. 6 is positioned against the shoulder 11 of Fig. 1, with the wings 24' projecting outwardly beyond the periphery of the flange 10, the same as do the wings 24 of Fig. 1. The lug 27' of the modification, while extending at a different angle than the lug 27 of Fig. 5, nevertheless functions in an identical manner in cooperation with one of the end seats 29.

From the above, it is apparent that the improved pipe joint is well suited for use in connection with milk pasteurizing equipment or in connection with other equipment for conveying edible fluids wherein sanitation is a factor. With the present invention, the pipe sections may be easily taken down for cleaning, and the union nuts may be completely removed from the sections so that the internal threading of the union nuts may be thoroughly scrubbed. In addition, the locking rings may be easily spread and removed from the pipe sections during cleaning.

The form of locking ring of Fig. 5 is particularly desirable because the use of the band 23, which fits within the flanged projections 19, precludes the possibility of the wing portions spreading outwardly as the nut is being tightened.

Various changes and modifications may be made without departing from the spirit of the invention, and all of such changes are contemplated as may come within the scope of the claims.

What I claim is:

1. In combination, a tube having an external annular flange adjacent an end forming a shoulder, a union nut having a main threaded bore portion for effecting a connection with an adjacent tube end, spaced arcuate flanges projecting inwardly at one end of said bore of the union nut, said flanges partially outlining a bore which is of less diameter than the external diameter of the external annular flange of the tube, the spaces between said arcuate flanges extending inwardly beyond the inner faces of said flanges, and a locking ring removably positioned adjacent the shoulder of the external flange of the tube and having radially projecting wings which are insertable into the spaces between the arcuate flanges of the union nut and engageable behind said flanges when the union nut is rotated relative to said wings.

2. In combination, a tube having an external annular flange adjacent an end forming a shoulder, a union nut having a main threaded bore portion for effecting a connection with an adjacent tube end, spaced arcuate flanges projecting inwardly at one end of said bore of the union nut, said flanges partially outlining a bore which is of less diameter than the main threaded bore portion and of greater diameter than the external diameter of the external annular flange of the tube, the spaces between said arcuate flanges extending inwardly beyond the inner faces of said flanges, a locking ring removably positioned adjacent the shoulder of the external flange of the tube and having radially projecting wings which are insertable into the spaces between the arcuate flanges of the union nut and engageable behind said flanges when the union nut is rotated relative to said wings, and means on the locking ring engageable with a portion of the union nut when the latter is being tightened to maintain the wings in position behind the flanges during tightening.

3. In combination, a tube having an external annular flange adjacent an end forming a shoulder, a union nut having a main threaded bore portion for effecting a connection with an adjacent tube end, spaced arcuate flanges projecting inwardly at one end of said bore of the union nut, said flanges partially outlining a bore which is of less diameter than the main threaded bore portion and of greater diameter than the external diameter of the external annular flange of the tube, the spaces between said arcuate flanges extending inwardly beyond the inner faces of said flanges, a locking ring removably positioned adjacent the shoulder of the external flange of the tube and having radially projecting wings which are insertable into the spaces between the arcuate flanges of the union nut and engageable behind said flanges when the union nut is rotated relative to said wings, and an angularly bent tongue on the locking ring which is engageable with a seat formed by an end of one of the arcuate flanges when the nut is being tightened, said tongue being so located as to maintain the wings in position behind the flanges during tightening.

4. In combination, a tube having an external annular flange adjacent an end forming a shoulder, a union nut having a main threaded bore portion for effecting a connection with an adjacent tube end, three equally spaced arcuate flanges projecting inwardly at one end of said bore of the union nut, said flanges partially outlining a bore which is of less diameter than the main threaded bore portion and of greater diameter than the external diameter of the external annular flange of the tube, the spaces between said arcuate flanges extending inwardly beyond the inner faces of said flanges and each space being approximately equal in length to the length of one of the arcuate flanges, and a locking ring removably positioned adjacent the shoulder of the external flange of the tube and having radially projecting wings which are insertable into the spaces between the arcuate flanges of the union nut and engageable behind said flanges when the union nut is rotated relative to said wings.

5. In combination, a tube having an external annular flange adjacent an end forming a shoulder, a union nut having a main threaded bore portion for effecting a connection with an adjacent tube end, spaced arcuate flanges projecting inwardly at one end of said bore of the union nut, said flanges partially outlining a bore which is of less diameter than the main threaded bore portion and of greater diameter than the external diameter of the external annular flange of the tube, the spaces between said arcuate flanges extending inwardly beyond the inner faces of said flanges, and a yieldingly removable split locking ring removably positioned adjacent the shoulder of the external flange of the tube and having radially projecting wings which are insertable into the spaces between the arcuate flanges of the union nut and engageable behind said flanges when the union nut is rotated relative to said wings.

6. In combination, a tube having an external annular flange adjacent an end forming a shoulder, a union nut having a main threaded bore portion for effecting a connection with an adjacent tube end, spaced arcuate flanges projecting inwardly at one end of said bore of the union nut, said flanges partially outlining a bore which is of less diameter than the main threaded bore portion and of greater diameter than the external diameter of the external annular flange of the tube, the spaces between said arcuate flanges extending inwardly beyond the inner faces of said flanges, a yieldingly removable split locking ring removably positioned adjacent the shoulder of the external flange of the tube and having radially projecting wings which are insertable into the spaces between the arcuate flanges of the union nut and engageable behind said flanges when the union nut is rotated relative to said wings, and means at the end of the locking ring engageable with a portion of the union nut when the latter is being tightened to maintain the wings in position behind the flanges during tightening.

7. In combination, a tube having an external annular flange adjacent an end forming a shoulder, a union nut having a main threaded bore portion for effecting a connection with an adjacent tube end, spaced arcuate flanges projecting inwardly at one end of said bore of the union nut, said flanges partially outlining a bore which is of less diameter than the external diameter of the external annular flange of the tube, the spaces between said arcuate flanges extending inwardly beyond the inner faces of said flanges, and a band removably positioned around the tube and having spaced edge flanges forming radially projecting wings positioned adjacent the shoulder on the external flange on the tube, said wings being positioned for insertion into the spaces between the arcuate flanges of the union nut and being engageable behind said flanges when the union nut is rotated relative to said wings.

8. In combination, a tube having an external annular flange adjacent an end forming a shoulder, a union nut having a main threaded bore portion for effecting a connection with an adjacent tube end, spaced arcuate flanges projecting inwardly at one end of said bore of the union nut, said flanges partially outlining a bore which is of less diameter than the external diameter of the external annular flange of the tube, the spaces between said arcuate flanges extending inwardly beyond the inner faces of said flanges, and a yieldingly removable split band positioned around the tube and having spaced edge flanges forming radially projecting wings positioned adjacent the shoulder on the external flange on the tube, said wings being positioned for insertion into the spaces between the arcuate flanges of the union nut and being engageable behind said flanges when the union nut is rotated relative to said wings.

9. In combination, a tube having an external annular flange adjacent an end forming a shoulder, a union nut having a main threaded bore portion for effecting a connection with an adjacent tube end, spaced arcuate flanges projecting inwardly at one end of said bore of the union nut, said flanges partially outlining a bore which is of less diameter than the external diameter of the external annular flange of the tube, the spaces between said arcuate flanges extending inwardly beyond the inner faces of said flanges, and a band removably positioned around the tube and having spaced edge flanges forming radially projecting wings positioned adjacent the shoulder on the external flange on the tube, said wings being positioned for insertion into the spaces between the arcuate flanges of the union nut and being engageable behind said flanges when the union nut is rotated relative to said wings, one of the ends of the band being bent outwardly to form a tongue which is engageable with a seat formed by an end of one of the arcuate flanges when the nut is being tightened, said tongue being so located as to maintain the wings in position behind the flanges during tightening.

WALTER EBERT.

REFERENCES CITED

The following references are of record in the file of this patent:

UNITED STATES PATENTS

| Number | Name | Date |
|---|---|---|
| 1,016,620 | Gapp | Feb. 6, 1912 |

FOREIGN PATENTS

| Number | Country | Date |
|---|---|---|
| 629,111 | Germany | Oct. 11, 1931 |